United States Patent [19]
Wynosky et al.

[11] 4,302,934
[45] Dec. 1, 1981

[54] LOBED MIXER/INVERTER

[75] Inventors: Thomas A. Wynosky, Madison; Donald C. Eiler, South Windsor; Jerrold R. Blatt, Newington, all of Conn.

[73] Assignee: United Technologies Corporation, Hartford, Conn.

[21] Appl. No.: 90,185

[22] Filed: Nov. 1, 1979

[51] Int. Cl.³ .............................................. F02K 1/40
[52] U.S. Cl. ...................................... 60/262; 60/264; 181/220
[58] Field of Search ......................... 60/264, 269, 262; 181/220

[56] References Cited

U.S. PATENT DOCUMENTS 3,861,140  1/1975  Krabacher .......................... 60/262
4,117,671 10/1978  Neal et al. ........................... 60/262
4,149,375  4/1979  Wynosky et al. ................... 60/262

FOREIGN PATENT DOCUMENTS 226690  2/1959  Australia ............................. 181/220

Primary Examiner—Robert E. Garrett
Attorney, Agent, or Firm—Norman Friedland

[57] ABSTRACT

A fairing added to the upstream end of the lobe of conventional lobed mixers or inverters for a gas turbine engine redirects the boundary layer so as to improve engine performance.

3 Claims, 3 Drawing Figures

LOBED MIXER/INVERTER

BACKGROUND OF THE INVENTION

This invention relates to gas turbine engines and particularly to multi-lobe forced mixers and/or inverters.

A typical lobe mixer utilized in the exhaust of a fan jet engine is disclosed in U.S. Pat. No. 4,149,375 granted to T. A. Wynosky, R. A. Streib and C. A. Campbell on Apr. 17, 1979 which is incorporated herein by reference. The purpose of this invention is to improve mixer performance and hence engine performance which is occasioned by redirecting the flow in the mixer by incorporating suitable fairing at discrete lobe locations.

We have found that providing suitable fairings at discrete locations on the mixer or inverter can reduce the total pressure loss of the flow passing through the mixer. Actual model and engine tests embodying this invention have shown an increase in thrust performance. It is contemplated within the scope of this invention that the fairings may be employed to control the area distribution of the fan or core flow paths at the entrance of the mixer lobes.

SUMMARY OF THE INVENTION

An object of this invention is to provide an improved lobe mixer or inverter for a fan jet engine.

A feature of this invention is to provide fairing means at the entrance of the lobe to control the flow path in the region at the entrance to the mixer lobes which define chutes for passing the flow of the core and fan.

Other features and advantages will be apparent from the specification and claims and from the accompanying drawings which illustrate an embodiment of the invention.

DESCRIPTION OF THE PREFERRED EMBODIMENT

Figure 1:
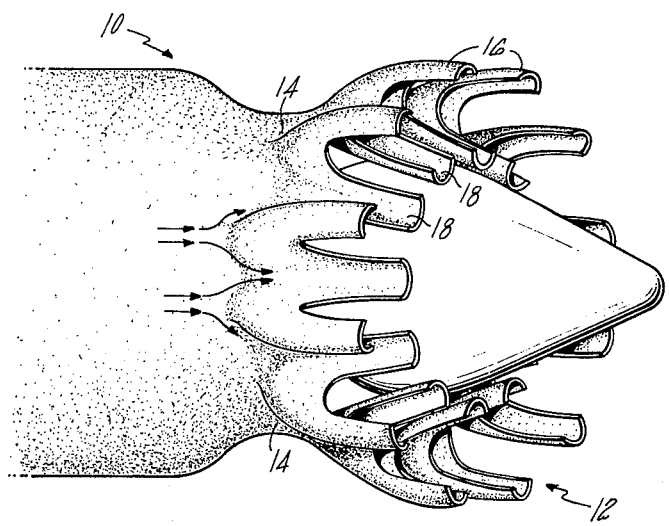
FIG. 1 is a perspective view of a prior art lobe mixer.

FIG. 1 exemplifies the prior art and a full description thereof may be had by referring to U.S. Pat. No. 4,149,375, supra which is incorporated herein by reference. Suffice it to say that the mixer is a generally cylindrical single piece body 10 fabricated from sheet metal and the lobes 12 are stamped in the shape generally shown. In this instance, the side walls between lobes are scalloped but such is not a limitation to which this invention applies. Further, as will be appreciated by anyone skilled in the art, the invention has equal applicability for inverters as well.

Suffice it to say that in the stamping out of the lobes, the cylindrical body 10 is inherently depressed at the junction 14 at the entrance of the lobes where they begin to radiate radially inward and outward. For purposes of this description, the radially outward extending lobes are referred to herein as the crowns 16 and the radially inward extending lobes are referred to herein as the valleys 18.

As can be seen in the prior art mixer, the force or entrance end of the crown 16 extends a substantial distance radially from the bottom of the depression 14. The fan flow seeing this obstruction tends to flow into the entrance of the adjacent valleys as shown by the flow arrows. The consequence of this effect is that the boundary layer flow is directed into the valleys and the boundary layer in this region becomes relatively thick, impeding the flow therethrough. This manifests into a pressure loss and loss of effective mixings resulting in a degradation of engine performance.

Figure 2:
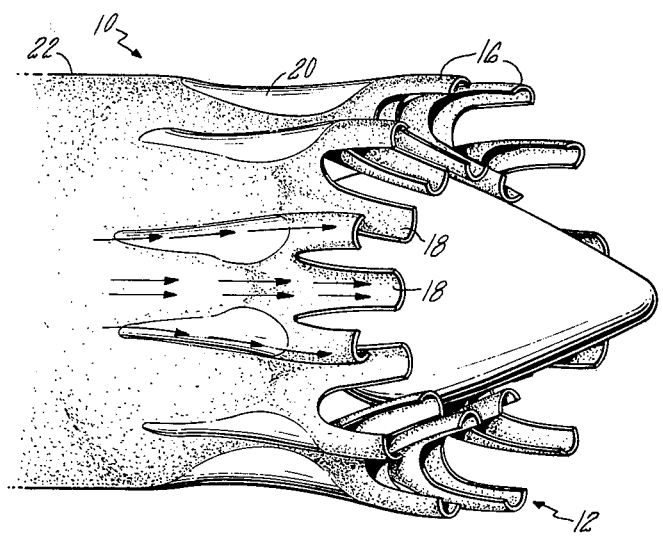
FIG. 2 is a perspective view similar to FIG. 1 with the improvement.
Figure 3:
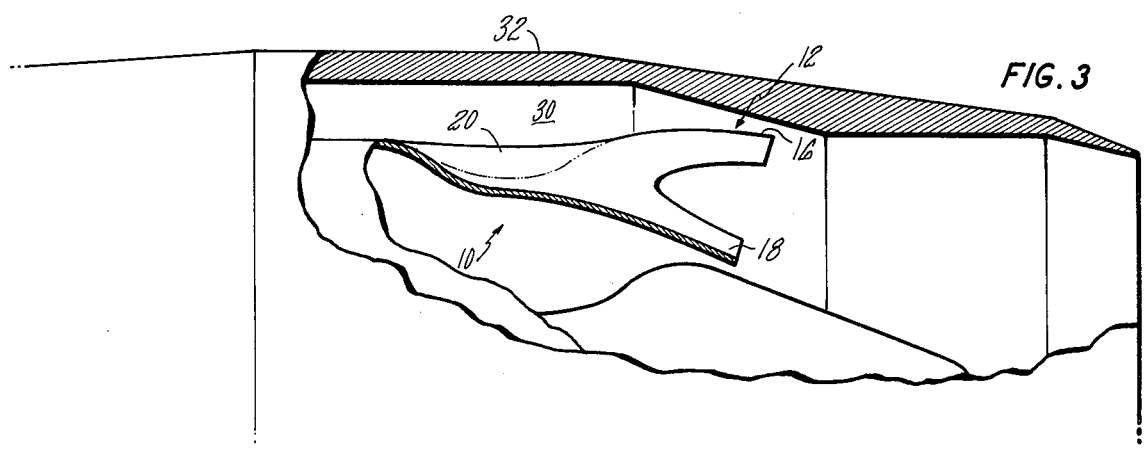
FIG. 3 is a schematic of the invention mounted in the exhaust of a fan jet engine.

According to the invention, fairings 20 are added to the entrance portion of the crown for redirecting the boundary layer flow entering the mixer. Hence, as noted from FIG. 2, the fairing 20 extends from the cylindrical fore body portion 22 over the depression 14 and adjacent the fore end of crown 16. This provides a uniform transition for the entrance flow which no longer impinges on the obstructive protrusion of the crown as happened in the heretofore mixer. This can be seen by the arrows in FIG. 2 representing the flow path at the entrance of the mixer. The substantial straight through flow avoids the boundary layer flow into the valley 18 of the mixer lobes reducing the portion thereof passing through the mixer and preventing the excessive boundary layer buildup at the entrance. Consequently, the reduced boundary layer thickness in the lobe valleys has a tendency to reduce flow separation and results in a more uniform flow at the mixer exit.

The fairing 20 also serves to define a generally straight through path for the fan air at the entrance of the lobe as defined by passage 30 made between the mixer and engine case 32. Without fairing 20, the depression 14 and engine case forms a diffuser with the attendent diffusion effect that impairs mixer performance. The straight through passage improves the area distribution of the fan air with a consequential improvement in mixer performance.

The fairing may be suitably secured in place to the lobed mixer by welding or bolted from the underside or any other mechanical fastening means.

It should be understood that the invention is not limited to the particular embodiments shown and described herein, but that various changes and modifications may be made without departing from the spirit and scope of this novel concept as defined by the following claims.

We claim:

1. A multi-lobed mixer for fan jet engine fabricated from a single generally cylindrically shaped member formed about an axially extending center line and having alternately circumferentially spaced radially inward and radially outward extending lobes on the aft end of said cylindrical member and forming chutes for directing fan and engine flow into mixing relationship, an annular depression formed intermediate the ends of said cylindrical member adjacent the flow entrance of said lobes, fairing means formed on the radially outward extending lobe bridging the depression and spanning the width of the attaching lobe and having its radial most extension portion extending substantially the same distance from said center line as the top portion of said radially outward extending lobe whereby a portion of the flow from the fan is directed substantially straight through over the top surface of said radially outward extending lobes.

2. A multi-lobed mixer as in claim 1 wherein said fairing means is mechanically fastened to the cylindrically shaped member.

3. In combination, an exhaust case for a gas turbine fan-jet engine, a lobed mixer having a generally cylindrically shaped hollow member concentrically mounted in said exhaust case and being spaced therefrom for defining an annular passage, said lobed mixer having a plurality of circumferentially spaced alternate radially inward and outward extending lobes on the end of said hollow member, the inward lobe forming a chute for directing the fan air radially inward and the outward lobe forming a chute for directing the jet exhaust from the turbine radially outward for encouraging mixing of the two streams, fairing means extending from a fore end of said hollow end to the radially outward extending lobe and spanning its width dimension and defining with said exhaust case a substantially straight through passage whereby the fan air adjacent the outward extending lobe passes straight over without migrating into the inward chute.

* * * * *